(12) United States Patent
Albrecht et al.

(10) Patent No.: US 12,487,570 B2
(45) Date of Patent: Dec. 2, 2025

(54) PLANNING A TECHNICAL PROCESS HAVING HIERARCHICALLY STRUCTURED TASKS AND PARALLELIZATION OPTIONS

(71) Applicant: Siemens Aktiengesellschaft, Munich (DE)

(72) Inventors: Sebastian Albrecht, Hallbergmoos (DE); Bernd Kast, Ichenhausen (DE); Wendelin Feiten, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 454 days.

(21) Appl. No.: 18/247,376

(22) PCT Filed: Oct. 4, 2021

(86) PCT No.: PCT/EP2021/077263
§ 371 (c)(1),
(2) Date: Mar. 30, 2023

(87) PCT Pub. No.: WO2022/073913
PCT Pub. Date: Apr. 14, 2022

(65) Prior Publication Data
US 2023/0418249 A1    Dec. 28, 2023

(30) Foreign Application Priority Data
Oct. 5, 2020    (EP) .................................... 20200014

(51) Int. Cl.
*G05B 15/02* (2006.01)
*B25J 9/16* (2006.01)

(52) U.S. Cl.
CPC ............ *G05B 15/02* (2013.01); *B25J 9/1661* (2013.01)

(58) Field of Classification Search
CPC .......... G05B 15/02; G05B 2219/40108; G05B 2219/40113; B25J 9/1661
See application file for complete search history.

(56) References Cited

U.S. PATENT DOCUMENTS 7,003,359 B2 *    2/2006    Phelps ................... G05B 15/02
                                                    700/105

FOREIGN PATENT DOCUMENTS

EP            3 511 126        7/2019

OTHER PUBLICATIONS

Kast, Bernd et al: "Hierarchical Planner with Composable Action Models for Asynchronous Parallelization of Tasks and Motions"; 2020 Fourth IEEE International Conference on Robotic Computing (IRC); pp. 143-150.

* cited by examiner

*Primary Examiner* — Mohammad Ali
*Assistant Examiner* — Sheela Rao
(74) *Attorney, Agent, or Firm* — Slayden Grubert Beard PLLC

(57) ABSTRACT

Various embodiments of the teachings herein include a computer-implemented method for executing a technical process comprising hierarchically structured tasks. The technical process includes modification of physical units. The method may include: providing dependency specifications for hierarchically structured tasks; deriving parallelization options from the dependency specifications; generating a first action sequence based on the parallelization options; and executing the first action sequence. The first action sequence implements the hierarchically structured tasks.

20 Claims, 3 Drawing Sheets

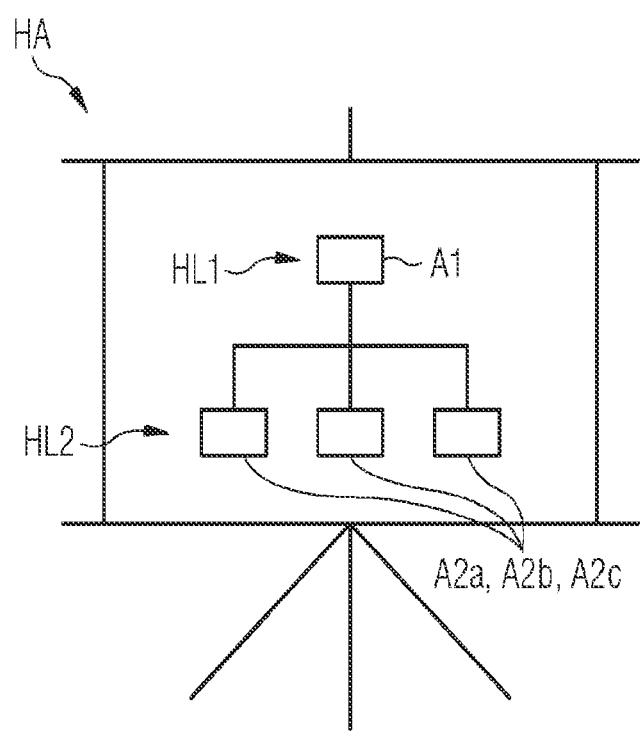

PLANNING A TECHNICAL PROCESS HAVING HIERARCHICALLY STRUCTURED TASKS AND PARALLELIZATION OPTIONS

CROSS-REFERENCE TO RELATED APPLICATIONS

This application is a U.S. National Stage Application of International Application No. PCT/EP2021/077263 filed Oct. 4, 2021, which designates the United States of America, and claims priority to EP Application No. 20200014.7 filed Oct. 5, 2020, the contents of which are hereby incorporated by reference in their entirety.

TECHNICAL FIELD

The present disclosure relates to technical processes. Various embodiments of the teachings herein include computer-implemented methods and/or systems for planning a technical process.

BACKGROUND

A "technical process" comprises hierarchically structured tasks, and includes a modification of physical units.

In numerous fields, the option is available for the employment of autonomous systems to execute tasks which, nowadays, on the grounds of engineering complexity, cannot be cost-effectively automated. This means that, in flexible or dynamic fields, the establishment of appropriate action plans, and the adequate execution thereof, are invariably required for any new variants. For a fixed variant which is subject to frequent repetition, particularly in mass production, the costs of manual design can optionally be assumed, although the level of flexibility required renders this strategy uneconomical.

A key focus is the automation of tasks which are essentially based upon the parallel execution of processes. Reference may be made to the following preferential fields:

Logistics and intralogistics: a plurality of components can move goods within a production plant or between production stations, at which further process steps can be executed on said goods. Autonomy can be provided in this context, in that individual mobile vehicles (AGVs) are coordinated in a centralized or decentralized manner. Moreover, this can also be considered as a sub-element of overall plant coordination, wherein the entire production process might then be controlled autonomously. New production tasks can thus be straightforwardly assumed, the number of AGVs varied, or responses to variable KPIs delivered.

Road traffic: a number of road vehicles and, in part, also stationary infrastructures, incorporate a series of sensors and, in part, vehicles can also be driven autonomously or in a partially autonomous manner. The question then arises, inter alia, of which sensors can be mutually combined in order to generate sufficiently accurate data for traffic planning or infrastructure control by the combination of sensors.

Passenger transport: the issue here is the selection of preferred combinations of public transport elements for the dynamic fulfilment of the requisite transport functions. This includes the configuration of an optimum transport plan, and the delivery of responses to congestion and delays, for example in rail traffic.

Processing industry: a number of continuous production processes require the coordinated control of pumps, of machines for mixing, heat-up or cooling, and of purification steps. In the light of complex processes in each component, sequences can only be permanently adjusted after detailed simulation and testing. The question thus arises of which simulations and tests will deliver the requisite information, and which control functions will minimize KPIs. As both of these options are time-consuming and cost-intensive, it is necessary for these steps to be mutually coordinated and parallelized to the greatest possible extent.

Imaging: in image processing, a plurality of algorithms are employed which are computationally intensive, and which will only deliver useful results further to task-dependent chain sequencing. In consequence, all the features of state-of-the-art computing architecture are utilized for the achievement of the maximum possible parallelization.

A common feature of all the above-mentioned fields of application is the necessity for the mutual coordination of a plurality of processes, and for the execution of these processes with a high degree of parallel control. Accordingly, autonomy in these fields will only be possible if parallelity issues are considered from the structural design/planning stage onwards, and are exploited to the maximum possible extent during execution.

One issue is therefore the automatic selection of appropriate elements from a plurality of potential elements for a parallel-executed response to a given issue, the structuring thereof in a network of multiple parallel-executed sequences, and the setting of appropriate parameters for the task. Two approaches are known, by means of which special cases can be addressed. As described above, the key challenge is the combination of the issue of scale and the requisite parallelity of execution with flexibility in the definition of tasks.

According to a first approach, on the understanding that only a limited flexibility is required and that the requisite range of values for the flexible components concerned is entirely known from the design phase onwards, the process is executed in a conventional manual manner. To this end, dependencies in the sequence of flexible components are manually encoded. Likewise, those processes which are to be executed in parallel are explicitly elaborated in the design process. This manual design process can comprise, for example, state machines, behavior trees or HTN components.

According to a second approach, very small-scale functions in specific and uniform fields (i.e. ideally exclusively symbolic tasks (also described as scheduling) or exclusively continuous tasks (also described as path planning)) are delivered by means of special planners. The result delivered by the planner can incorporate elements of parallelity (particularly in the form of a Petri net) which can then be utilized by the employment of corresponding execution components.

SUMMARY

The teachings of the present disclosure include solutions for the planning of technical processes which comprise hierarchical tasks with parallelization options and improved solutions for the planning of mutually dependent technical tasks and technical processes. In particular, the teachings herein can be employed for the planning and execution of a technical process having hierarchically structured tasks and parallelization options.

For example, some embodiments include a computer-implemented method for planning a technical process (P), wherein the technical process (P) comprises hierarchically structured tasks (A), and wherein the technical process (P) includes a modification of physical units, having the following steps: Inputting (S1) of dependency specifications for hierarchically structured tasks (A), Deriving (S2) of parallelization options from the dependency specifications, and Generating (S3) a first action sequence (AS1) in consideration of parallelization options, wherein the first action sequence (AS1) implements the hierarchically structured tasks (A).

In some embodiments, the method further includes Execution (S3b) of hierarchically structured tasks (A) in the technical process (P) by the execution of the first action sequence (AS1).

In some embodiments, the method further includes: Reception (S4) of process data, wherein process data comprise an actual state of the technical process (P), Generating (S5) a second action sequence (AS2) by reference to process data, and Execution (S5b) of hierarchically structured tasks (A) in the technical process (P), by the execution of the second action sequence (AS2).

In some embodiments, the second action sequence (AS2) replaces the first action sequence (AS1), or the second action sequence (AS2) follows the first action sequence (AS1) in time, or the second action sequence (AS2) halts the technical process (P).

In some embodiments, the technical process (P) is executed by at least one production unit, wherein the at least one production unit is configured in the form of: a production machine, a production robot and/or an automation unit.

In some embodiments, the technical process (P) is configured in the form of: a manufacturing process and/or a logistics process and/or a traffic management process and/or a transport process.

In some embodiments, dependency specifications define hierarchically structured tasks (A) with respect to the following: process sequence and/or causal dependencies and/or relations of interaction and/or temporal information and/or required resources and/or mandatorily simultaneously executed tasks and/or tools required.

In some embodiments, dependency specifications indicate those dependencies which occur during the execution of hierarchically structured tasks (A).

In some embodiments, each of the hierarchically structured tasks (A) comprises a hierarchy specification (HA), each hierarchy specification (HA) defines a hierarchical level within the process, such that a first task (A1) in a first hierarchical level (HL1) is defined in greater detail by at least one second task (A2a, A2b, A2c) in a second hierarchical level (HL2), wherein the first task (A1) and the second task (A2) are included in the hierarchically structured tasks (A).

In some embodiments, the method further includes: Reception (S6) of a user input, and Generation (S7) of a third action sequence (AS3) by reference to the user input.

In some embodiments, the third action sequence (AS3) replaces the first action sequence (AS1) and/or the second action sequence (AS2), or the third action sequence (AS3) follows the first action sequence (AS1) and/or the second action sequence (AS2) in time, or the third action sequence (AS3) halts the technical process (P).

In some embodiments, parallelization options deliver specifications for a temporal parallelization of hierarchically structured tasks (A).

As another example, some embodiments include a computer program product, comprising a computer program, wherein the computer program is loadable into a memory device of a computing unit and wherein, by means of the computer program, steps of one or more methods as described herein are executed, if the computer program is run on the computing unit.

As another example, some embodiments include a computer-readable medium on which a computer program is saved, wherein the computer program is loadable into a memory device of a computing unit and wherein, by means of the computer program, steps of one or more methods as described herein are executed, if the computer program is run on the computing unit.

BRIEF DESCRIPTION OF THE DRAWINGS

Particular features and advantages of the teachings herein will become apparent from the following descriptions of a plurality of exemplary embodiments, with reference to the schematic drawings. In the drawings:

FIG. 3 shows hierarchy specifications.

DETAILED DESCRIPTION

Figure 1:
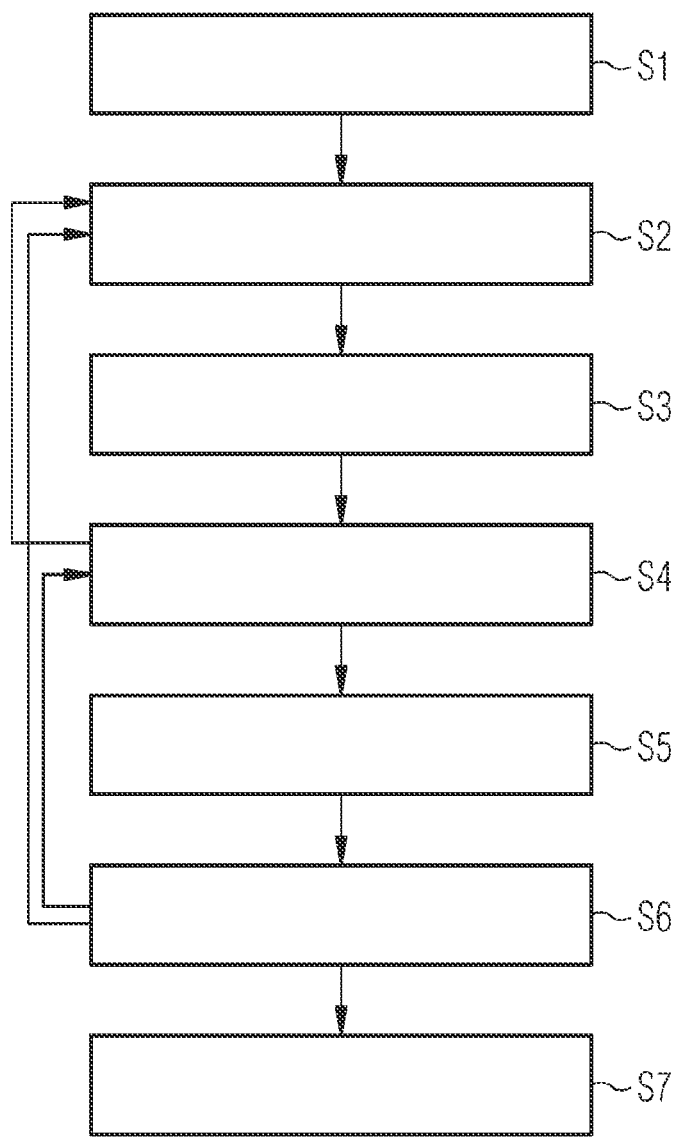
FIG. 1 shows a flow diagram of an example method incorporating teachings of the present disclosure.

The present disclosure relates to computer-implemented methods for planning a technical process, wherein the technical process comprises hierarchically structured tasks, and wherein the technical process (P) includes a modification of physical units. For example, some embodiments of the teachings herein include a computer-implemented method comprising:

Inputting of dependency specifications for hierarchically structured tasks;

Deriving of parallelization options from the dependency specifications, and

Generating a first action sequence in consideration of parallelization options, wherein the first action sequence implements the hierarchically structured tasks.

Hierarchically structured tasks, within the meaning of the present disclosure, are tasks which are structured in different hierarchical levels. An upper hierarchical level can comprise a task which is specified in greater detail by further tasks in the underlying hierarchical level.

In particular, each of the hierarchically structured tasks comprises a hierarchy specification, wherein each hierarchy specification defines a hierarchical level within the process, such that a first task in a first hierarchical level is defined in greater detail by further tasks (or at least by a second task) in a second hierarchical level, wherein the first task and the at least one second task/further tasks are included in the hierarchically structured tasks. In particular, a first hierarchical level can be defined by the first tasks: "planning, execution, control, response". On a second hierarchical level, the first task "control", on the second hierarchical level, can define (the at least one second or further) tasks: "measurement of actual values, retrieval of target values, comparison of actual values and target values, calculation of deviations".

A modification of physical units, within the meaning of the present invention, includes modifications, particularly alterations, adjustments, manufacturing processes, production steps, processing functions and/or adaptations executed on physical units, particularly objects in the material world. These include, in particular, the milling of a manufactured part, an assembly of individual components, surface treatment of a workpiece, transformation of a workpiece and/or other modifications to physical units which are executed in the context of manufacturing processes.

Dependency specifications of tasks, within the meaning of the present disclosure, are specifications which indicate dependencies between the above-mentioned hierarchical tasks. In particular, dependencies can be causal and/or temporal.

Causal dependencies provide a specification of causal dependencies in a technical process, particularly dependencies associated with actions which can only be executed once previous (either directly or indirectly preceding) actions have been completed, and the results thereof are available, particularly lacquering after molding. In particular, one action can also be dependent upon a plurality of preceding (parallel or successive) actions. Temporal information provides a specification of temporal dependencies in a technical process, particularly processing times, waiting times, delivery times, working times and resting times.

Parallelization options for tasks, within the meaning of the present invention, in particular, are options for the potential parallel execution of hierarchically structured tasks. Thus, in particular, options can be provided for the parallelization of tasks in the same hierarchical level.

The first action sequence, within the meaning of the present invention, is a sequence of actions, wherein said actions implement the hierarchically structured tasks. The sequence can include sequential and/or parallel actions. A hierarchical task, for the cleaning of a machine, can define the associated actions: "blasting", "polishing", "washing" and "drying".

Some embodiments of the teachings herein include the planning of a technical process which comprises hierarchically structured tasks, and the associated consideration of parallelization options for hierarchically structured tasks. By providing dependency specifications for hierarchically structured tasks, a hierarchical planner generates successive action sequences, which can also be described as subplans, having an incrementally rising level of detail, on the basis of hierarchical models for declarative and procedural knowledge of all relevant elements and procedures associated with a technical process. To this end, appropriate action sequences for the technical process are transmitted to special planning components. Each step in the subplan thus obtained is then formulated as a new hierarchical task with a greater level of detail, until such time as all the processes for the task contained in the plan are defined in sufficient detail.

By way of distinction from sequential planning, the hierarchical planner is not only required to deliver the relevant modeling entities to the subplanner, but also temporal information associated therewith. This includes identification of the time at which a specific entity was generated, or the time intervals at which components thereof are ordered. This is absolutely essential to the consideration of the effects of parallelization during planning.

By the derivation of parallelization options from dependency specifications, a parallelization component receives plans from the hierarchical planner which include or permit elements of parallelity, and initiates the parallel execution thereof on hardware. This means that, according to the plan, a plurality of processes are started simultaneously.

Further to the generation of the first action sequence, in consideration of parallelization options, the hierarchical planner (which can also be described as the planning component) delivers a first action sequence to the parallelization component, i.e. a partially-ordered quantity of actions, wherein this order, in the first instance, indicates only causal dependencies, rather than any explicit indication of temporal dependencies. Any two actions in this plan, between which no relationship between the resource requirements thereof is indicated, whether explicitly, i.e. particularly by way of a direct indication of the order relationship between actions, or implicitly, i.e. particularly by reference to a chain sequence of other order relationships, are candidates for parallel execution.

A lock is a temporal restriction between actions in a plan, which originates from the causal order relationship in the plan, wherein results from two different preceding actions are required as input variables, i.e. both results are available simultaneously, such that the most recent action can be initiated. The parallelization component identifies locks of this type and, by reference to the latter, determines sequences of actions which can be executed in parallel. Immediately all the input variables for a given sequence are available, the latter can be initiated, independently of other processes in progress.

Some embodiments include a method for executing a technical process, wherein the technical process has been planned by a method according to the invention. The methods for executing the technical process comprise a further process step for the execution of hierarchically structured tasks in the technical process associated with the execution of the first action sequence. For the execution of hierarchically structured tasks in the technical process by the execution of the first action sequence, it likewise applies that the latter is executed in the material world.

In some embodiments, the method comprises: reception of process data, wherein process data comprise an actual state of the technical process and generating a second action sequence by reference to process data, wherein the second action sequence implements the hierarchically structured tasks. This includes execution of hierarchically structured tasks in the technical process, by the execution of the second action sequence. In the event of significant deviations from results for the first action sequence, the parallelization component will feed these back to the hierarchical planner, such that the latter can establish a planning adjustment, i.e. the second action sequence.

This parallel execution mandatorily includes a monitoring component, which executes a check as to whether all the actions in an action sequence fulfil conditions which have been calculated during planning, also described as the target state. Both in the event of significant deviations, particularly on the grounds that the results of the first action sequence lie outside the anticipated range of values, or in the event of a malfunction, particularly on the grounds that the first action sequence cannot be successfully completed, the monitoring component will deliver corresponding information to the planning component, such that a new plan, i.e., according to the wording of the invention, a second action sequence, can be established. In particular, the planning component is notified of those actions, and the input and output variables thereof, which have been responsible for the interruption of execution. According to feedback received, the planning component can opt for replanning or the continuation of the plan. The process will then commence from this point.

In some embodiments, the second action sequence replaces the first action sequence. This provides that the technical process is replanned.

In some embodiments, the second action sequence follows the first action sequence in time. This provides an adapted continuation of the technical process. Deviations and errors can be corrected accordingly.

In some embodiments, the second action sequence halts the technical process. This provides that no further action sequence is executed, and an interruption of the technical process occurs.

In some embodiments, the technical process is executed by at least one production unit, wherein the at least one production unit is configured in the form of a production machine, a production robot and/or an automation unit. The at least one production unit executes the technical process in the material world.

In some embodiments, the technical process is configured in the form of:
- a manufacturing process and/or
- a logistics process and/or
- a traffic management process and/or
- a transport process.

In some embodiments, dependency specifications define hierarchically structured tasks with respect to the following:
- process sequence and/or
- causal dependencies and/or
- relations of interaction and/or
- temporal information and/or
- required resources and/or
- mandatorily simultaneously executed tasks and/or
- tools required.

The process sequence provides a specification of process-related dependencies in the technical process. Causal dependencies provide a specification of causal dependencies in the technical process, particularly dependencies associated with actions which cannot be executed until previous, particularly directly or indirectly preceding actions have been completed, and the results thereof are available, particularly lacquering after molding. In particular, one action can also be dependent upon a plurality of preceding actions, particularly parallel or successive actions.

Relations of interaction provide a specification of interaction-related dependencies in a technical process, particularly where components for the execution of actions are required to execute actions in mutual combination, particularly in the event that a first component is a holding robot arm, and a second component is a processing robot arm. Temporal information provides a specification of temporal dependencies in a technical process, particularly processing times, waiting times, delivery times, working times and resting times. Required resources provide a specification of the requisite resources for a technical process, particularly hardware, materials, goods, financial resources, manpower, space and environmental conditions, particularly temperature, pressure and humidity.

Mandatorily simultaneously executed tasks provide a specification of tasks in a technical process which are to be mandatorily executed in a simultaneous manner, in particular tasks having a mutually complementary function, particularly cleaning and the supply of water. Tools required provide an indication of the requisite tools for a technical process, particularly an indication of tools which are required simultaneously/in parallel, anticipated tool wear, spatial requirements for tools, deployment times for tools, conditions of application and/or application resources for tools.

In some embodiments, dependency specifications indicate those dependencies which occur during the execution of hierarchically structured tasks. In particular, reference may be made to the above-mentioned dependencies.

In some embodiments, each of the hierarchically structured tasks comprises a hierarchy specification, wherein each hierarchy specification defines a hierarchical level within the process, such that a first task in a first hierarchical level is defined in greater detail by further tasks, according to the wording of the invention, by at least one second task in a second hierarchical level, wherein the first task and the at least one second task/further tasks is/are included in the hierarchically structured tasks. In particular, a first hierarchical level can be defined by the first tasks: "planning, execution, control, response". On a second hierarchical level, the first task "control", on the second hierarchical level, can define the at least one second task or further tasks: "measurement of actual values, retrieval of target values, comparison of actual values and target values, calculation of deviations".

In some embodiments, the method comprises: reception of a user input, and generating a third action sequence by reference to the user input.

In some embodiments, an interaction with persons, particularly by way of a user input, and an adaptation of action sequences is possible. This is particularly relevant in the case of commissioning and partial automation. In this case, hierarchical models permit a graphic representation of data and processes, in accordance with the respective user role. Partially automated operation of this type permits access to the unmodelled experiences of persons who are entrusted with the execution of processes. In each case, the hierarchy of tasks permits a focus on the relevant aspects. Accordingly, an interaction component can comprise the selection of a preferred plan from a quantity of comparable plans, the specification of additional temporal locks or the combination of sequences, or the delivery of feedback for the expansion of attributes or the specification of the level of further planning.

In some embodiments, the third action sequence replaces the first action sequence and/or the second action sequence, or the third action sequence succeeds the first action sequence and/or the second action sequence in time, or the third action sequence halts the technical process. This provides an advantage, in that replanning of the technical process is executed, deviations and errors can be corrected, no further action sequence is executed, and an interruption of the technical process occurs.

In some embodiments, parallelization options deliver specifications for a temporal parallelization of hierarchically structured tasks.

Some embodiments of the teachings herein comprise a computer program product, comprising a computer program, wherein the computer program is loadable into a memory device of a computing unit and wherein, by means of the computer program, steps of one or more of the methods described herein are executed, if the computer program is run on the computing unit.

Some embodiments include a computer-readable medium on which a computer program is saved, wherein the computer program is loadable into a memory device of a computing unit and wherein, by means of the computer program, steps of one or more of the methods described herein can be executed, if the computer program is run on the computing unit.

The manual generation of action sequences is time-consuming, inflexible and error-prone. The combination of the introduction of flexibility or the modification of parallel processes multiplies this issue further. The invention massively reduces the amount of time spent, as only one-off modeling is required. The planning component then provides flexibility and ensures that, in combination with the monitoring unit, a multiplicity of errors can be excluded. A central factor is the employment of a hierarchy, thus permitting the achievement of a hierarchy of manageable production tasks. The alternative approaches, in general, are not applicable, as the complexity of the issue is either too great, or the issue cannot be resolved without parallelization.

The consideration of parallelization from the planning stage onwards permits strategies to be tailored to existing hardware in a highly detailed manner. It is thus possible, for example, to consider the influence of the number of cores in the CPU, or the number of AGVs available. Additionally, detailed dependencies can be taken into consideration, particularly with respect to robots which share a working space, i.e. hierarchical planning also permits the hierarchical identification of aspects which are relevant to parallelization: from discrete or symbolic through to continuous or subsymbolic. The complexity of compliance with a plurality of these dependencies is a key advantage of the hierarchical approach.

Various embodiments may permit an interaction of a plurality of components for the delivery of flexible, error-free and parallel execution in large-scale and heterogeneous fields. Models, subplans and, optionally, error states are interchanged for this purpose. The fully-automated calculation of plans, and the parallel execution thereof, results in the regulation of hardware in the material world. By the interaction of execution with hierarchical planning, incorporating deviations and errors, an adaptive method is produced, which responds to external influences. Sensor measurements during execution thus modify the behavior of the autonomous system.

The hierarchical planning of parallel processes is relevant in a multiplicity of industrial applications. Wherever aspects of autonomous systems or Industry 4.0 have the potential, these aspects can be addressed by formal models and planning. Examples specified from the prior art provide an indication of fields of application. These range from advanced MES and simulation tools such as Process Simulate and Co-Simulation, through to traffic management systems.

Various embodiments incorporate the following key-based algorithms:

Hierarchical planning component for parallelity: the previous hierarchical planning component did not record temporal information during the generation of plans, and generated a sequential plan. The extension of the hierarchical approach to incorporate scheduling, wherein the temporal availability of entities is essential and the preferred selection of plans with a high parallelization component is thus executed, is a central aspect of the present invention.

Parallelization unit: the analysis of plans and the identification of sequences is indispensable to parallel control. This component is not present in sequential hierarchical planning. In other fields, particularly in Petri nets, similar definitions of tasks are considered.

Execution and feedback: parallel execution is based upon the coordinated start-up of a plurality of processes, and the subsequent synchronization thereof. Algorithms of this type are known in a multiplicity of applications. A specific aspect of the present invention is that, by means of feedback in the event of deviations and errors, control is adapted. To this end, it is necessary for feedback to include detailed information, which permits the exact reconstruction of which process and which input data have given rise to the feedback concerned. Moreover, it may be necessary for further parallel processes, in response to this detailed information, to be terminated, or at least that no new processes in parallel sequences are initiated.

Planning adaptation in response to feedback: it is essential to planning adaptation that information should be permitted to influence execution, in order to prevent any recurrence of an issue. This means that an issue cannot be resolved by a simple restart of planning. The backtracking approach to hierarchical planning permits the delivery of an appropriate response to information of this type. This involves the successive identification of abstraction stages, wherein alternative plans are generated which permit an objective to be pursued in the absence of the fault-affected process. Starting from an alternative plan, it is then proceeded as per nominal hierarchical planning for parallel processes.

FIG. 1 shows a flow diagram of an example method incorporating teachings of the present disclosure for planning a technical process, wherein the technical process comprises hierarchically structured tasks, and wherein the technical process (P) includes a modification of physical units, including:

Step S1: Inputting of dependency specifications for hierarchically structured tasks, Step S2: Deriving of parallelization options from the dependency specifications, Step S3: Generating a first action sequence in consideration of parallelization options, wherein the first action sequence implements the hierarchically structured tasks, Step S4: Reception of process data, wherein process data comprise an actual state of the technical process, Step S5: Generating a second action sequence by reference to process data, wherein the second action sequence implements the hierarchically structured tasks, Step S6: Reception of a user input, and Step S7: Generating a third action sequence by reference to the user input.

Thereafter, in particular, an (unrepresented) execution S3b of hierarchically structured tasks A of the technical process P can proceed by the execution of the first action sequence AS1. Moreover, a subsequent (unrepresented) execution S5b of hierarchically structured tasks A of the technical process P can proceed by the execution of the second action sequence AS2.

The flow diagram is not to be considered as strictly sequential. Steps S1 to S6 can also be executed in different sequences. In particular, it is also possible for previously executed steps to be repeated, in the event that input from sensors, particularly process data (step S4), or input from a user (step S6) is received. Input from sensors, particularly process data (step S4) or input from a user (step S6) can particularly result in modifications to the planning or parallelization task.

Figure 2:
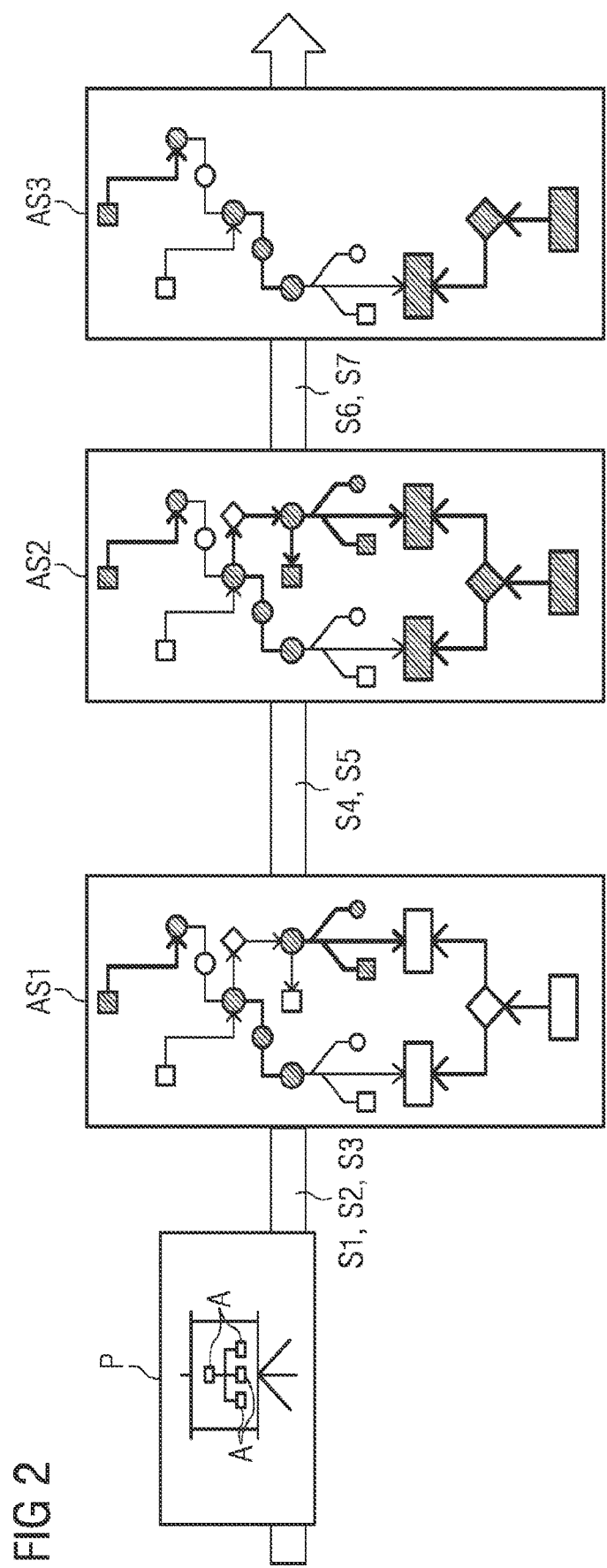
FIG. 2 shows a flow diagram of the generation of action sequences.

FIG. 2 shows a flow diagram of the generation of action sequences for a technical process P, wherein the technical process comprises hierarchically structured tasks A. Inputting of hierarchically structured tasks A is executed, and a first action sequence AS1 is generated by step S1, step S2 and step S3 (see FIG. 1). Thereafter, a second action sequence AS2 is generated by step S4 and step S5 (see FIG. 1). At any time, a third action sequence AS3 can be generated by steps S6 and S7. The second action sequence AS2 can replace or supplement the first action sequence AS1 and/or can deliver alternatives thereto. The same applies to the third action sequence AS3 vis-à-vis the second action sequence AS2.

FIG. 3 shows hierarchy specifications HA for hierarchically structured tasks A1, A2, wherein each hierarchy specification HA defines a hierarchical level within the process, such that a first task A1 in a first hierarchical level HL1 is defined in greater detail by a plurality of second tasks A2a, . . . , A2c (in FIG. 3, by three second tasks) on the second hierarchical level HL2, wherein the first task A1 and the second task A2 are elements of the hierarchically structured tasks A, and it is then established, by planning, which tasks are to be combined on the second hierarchical level, in order to achieve the objective of the abstract task A1.

Although the teachings of the present disclosure have been illustrated and described in greater detail by reference to exemplary embodiments, the disclosure is not limited to the examples disclosed, and further variations can be inferred herefrom by a person skilled in the art, without departing from the protective scope thereof.

LIST OF REFERENCE SYMBOLS

A hierarchically structured task
AS1 first action sequence
AS2 second action sequence
AS3 third action sequence
A1 first task
A2a,b,c at least one second task
HA hierarchy specification
HL1 first hierarchical level
HL2 second hierarchical level
Si step i, i=[1; 7]
P technical process

What is claimed is:

1. A computer-implemented method for executing a technical process comprising hierarchically structured tasks, and wherein the technical process includes modification of physical units, the method comprising:
providing dependency specifications for hierarchically structured tasks;
deriving parallelization options from the dependency specifications;
generating a first action sequence based on the parallelization options;
executing the first action sequence;
receiving process data reflecting an actual state of the technical process;
generating a second action sequence based on the process data; and
executing hierarchically structured tasks in the technical process based on the second action sequence
wherein the first action sequence implements the hierarchically structured tasks; and
the second action sequence replaces the first action sequence; or
the second action sequence follows the first action sequence in time; or
the second action sequence halts the technical process.

2. The method as claimed in claim 1, wherein:
the technical process is executed by a production unit; and
the production unit is configured in the form of: a production machine, a production robot and/or, an automation unit.

3. The method as claimed in claim 1, wherein the technical process comprises: a manufacturing process, a logistics process, a traffic management process, and/or a transport process.

4. The method as claimed in claim 1, wherein dependency specifications define hierarchically structured tasks with respect to: process sequence, causal dependencies, relations of interaction, temporal information, required resources, mandatorily simultaneously executed tasks, and/or tools required.

5. The method as claimed in claim 1, wherein dependency specifications indicate those dependencies which occur during the execution of hierarchically structured tasks.

6. The method as claimed in claim 1, wherein:
each of the hierarchically structured tasks comprises a hierarchy specification;
each hierarchy specification defines a hierarchical level within the process, such that a first task in a first hierarchical level is defined in greater detail by at least one second task in a second hierarchical level; and
the first task and the second task are included in the hierarchically structured tasks.

7. The method as claimed in claim 1, further comprising:
receiving a user input; and
generating a third action sequence based on the user input.

8. The method as claimed in claim 7, wherein:
the third action sequence replaces the first action sequence and/or the second action sequence; or
the third action sequence follows the first action sequence and/or the second action sequence in time; or
the third action sequence halts the technical process.

9. The method as claimed in claim 1, wherein parallelization options deliver specifications for a temporal parallelization of hierarchically structured tasks.

10. A computer-readable medium on which a computer program is saved, wherein the computer program is loadable into a memory device of a computing unit and, when executed by a processor of the computing unit, executes a technical process comprising hierarchically structured tasks and modification of physical units by:
providing dependency specifications for hierarchically structured tasks;
deriving parallelization options from the dependency specifications; and
generating a first action sequence based on the parallelization options; and
executing the first action sequence;
wherein the first action sequence implements the hierarchically structured tasks; and
the second action sequence replaces the first action sequence; or
the second action sequence follows the first action sequence in time; or
the second action sequence halts the technical process.

11. A computer-implemented method for executing a technical process comprising hierarchically structured tasks, and wherein the technical process includes modification of physical units, the method comprising:
providing dependency specifications for hierarchically structured tasks;
deriving parallelization options from the dependency specifications;
generating a first action sequence based on the parallelization options; and
executing the first action sequence;
wherein the first action sequence implements the hierarchically structured tasks;

each of the hierarchically structured tasks comprises a hierarchy specification;

each hierarchy specification defines a hierarchical level within the process, such that a first task in a first hierarchical level is defined in greater detail by at least one second task in a second hierarchical level; and the first task and the second task are included in the hierarchically structured tasks.

12. The method as claimed in claim 11, further comprising:

receiving process data reflecting an actual state of the technical process;

generating a second action sequence based on the process data; and executing hierarchically structured tasks in the technical process based on the second action sequence.

13. The method as claimed in claim 12, wherein:

the second action sequence replaces the first action sequence; or the second action sequence follows the first action sequence in time; or the second action sequence halts the technical process.

14. The method as claimed in claim 11, wherein:

the technical process is executed by a production unit; and the production unit is configured in the form of: a production machine, a production robot and/or, an automation unit.

15. The method as claimed in claim 11, wherein the technical process comprises: a manufacturing process, a logistics process, a traffic management process, and/or a transport process.

16. The method as claimed in claim 11, wherein dependency specifications define hierarchically structured tasks with respect to: process sequence, causal dependencies, relations of interaction, temporal information, required resources, mandatorily simultaneously executed tasks, and/or tools required.

17. The method as claimed in claim 11, wherein dependency specifications indicate those dependencies which occur during the execution of hierarchically structured tasks.

18. The method as claimed in claim 11, further comprising:

receiving a user input; and generating a third action sequence based on the user input.

19. The method as claimed in claim 18, wherein:

the third action sequence replaces the first action sequence and/or the second action sequence; or the third action sequence follows the first action sequence and/or the second action sequence in time; or the third action sequence halts the technical process.

20. The method as claimed in claim 11, wherein parallelization options deliver specifications for a temporal parallelization of hierarchically structured tasks.

* * * * *